(No Model.)
R. McLEOD, Jr. & A. M. McLEOD.
PNEUMATIC TIRE FOR CYCLES.
No. 594,269. Patented Nov. 23, 1897.
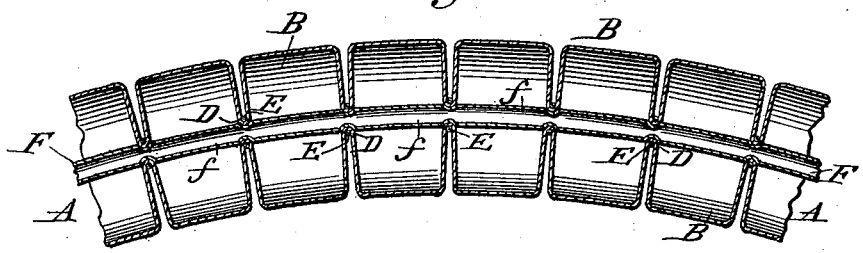
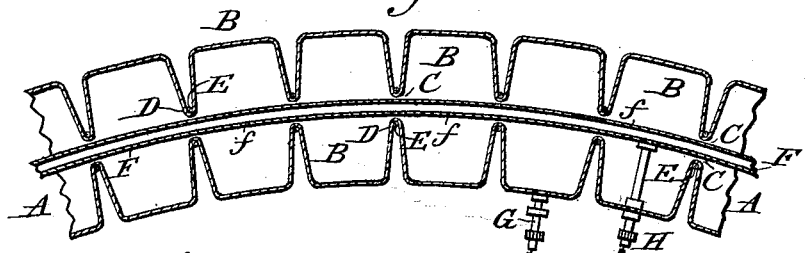
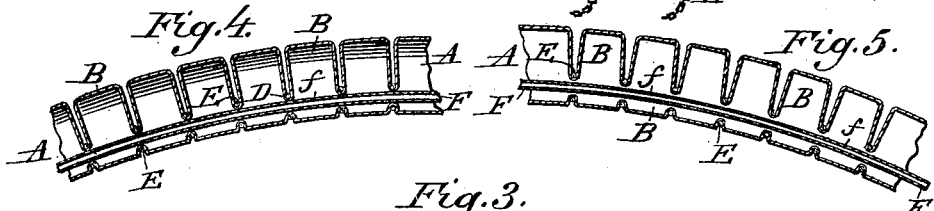
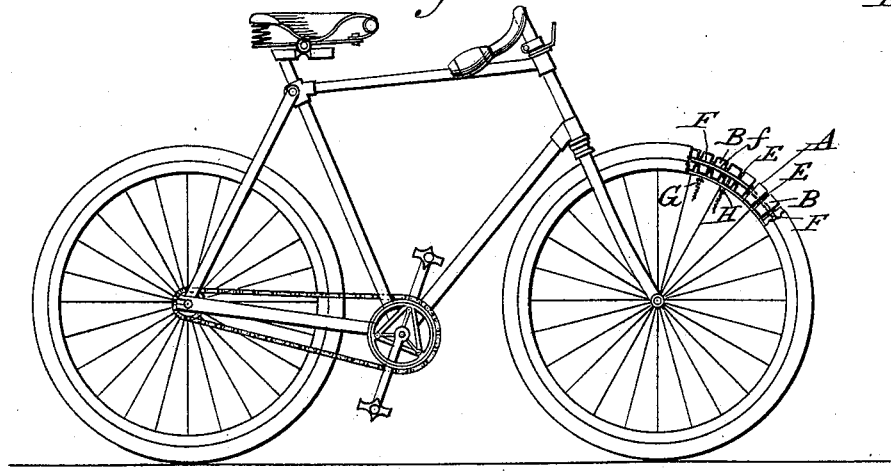
Witnesses
F. H. Schott
Walter Allen
Inventors
Roderick McLeod Jr.
Alexander Mathers McLeod
by Knight Bros. Attorneys.
THE NORRIS PETERS CO., PHOTO-LITHO., WASHINGTON, D. C.

UNITED STATES PATENT OFFICE.

RODERICK McLEOD, JR., AND ALEXANDER MATHERS McLEOD, OF EDINBURGH, SCOTLAND.

PNEUMATIC TIRE FOR CYCLES.

SPECIFICATION forming part of Letters Patent No. 594,269, dated November 23, 1897.

Application filed December 11, 1896. Serial No. 615,373. (No model.)

*To all whom it may concern:*

Be it known that we, RODERICK McLEOD, Jr., wholesale tea merchant, residing at 69 George Street, and ALEXANDER MATHERS McLEOD, solicitor, residing at 20 Greenhill Gardens, Edinburgh, in the county of Mid-Lothian, Scotland, subjects of the Queen of Great Britain and Ireland, have invented Improvements in Pneumatic Tires for Vehicles, of which the following is a specification.

This invention relates to improvements in pneumatic tires for cycles, carriages, motor-cars, and other vehicles, and has for its object to construct these tires in such a manner that in the event of the tires becoming punctured they will not collapse.

Our invention consists in a tire having novel features of construction, as hereinafter described and claimed.

In order that our invention may be properly understood and readily carried into effect, we have hereunto appended an explanatory sheet of drawings, in the several figures of which corresponding parts are marked with the same letters of reference.

Figure 1 is a section of part of tire constructed according to our improvements in its inflated condition. Fig. 2 is a similar view of part of tire in the act of being inflated. Fig. 3 is a side view of a cycle with the tire constructed according to our improvements, the tire being shown partly in elevation with a cover, partly in section without a cover, and partly in elevation without a cover. Fig. 4 is a section of part of tire, showing the small air-tube passing through the sectional air-tube near the bottom; and Fig. 5 is a similar view showing tire in the act of being inflated.

In carrying out our invention we have one continuous air-tube A, but it is so constructed as to form separate sections or compartments B, of perhaps one inch or less or more, as may be found most desirable, which communicate with each other by means of necks $a$ providing passages C when the tire is in the act of being inflated, as seen more particularly in Figs. 2 and 5. Where these compartments B communicate with each other necks or bridges D are formed, around the outside of which narrow strips, bands, or rings E, of aluminium, steel, or other suitable metal or material, are or may be placed. These strips, bands, or rings E may be covered with india-rubber, cloth, or other material to prevent the edges in any way damaging the sectional air-tube A. Passing through the sectional air-tube A and through these necks or bridges D there is a tube F, of any suitable material or combination of materials and of small circumference. This tube F when it has been inflated will act as a valve for each section or compartment B, as seen more particularly in Figs. 1, 3, and 4.

The sectional air-tube A is provided with a suitable valve G, and when it has been inflated, which is accomplished in the ordinary manner, the sections or compartments D lie contiguous to one another, or nearly so, thereby making a continuous tube, as shown more particularly in Figs. 1, 3, and 4. The smaller tube F, which is also provided with a suitable valve H, is then inflated, when its outer edges $f$ press hard up against the necks or bridges D of the sectional air-tube A already referred to, thereby completely closing the passage leading from one section or compartment B to the other and making each one self-contained and independent of the other, as seen in Figs. 1, 3, and 4, the restricted diameter of the necks or bridges D preventing the expansion of the smaller tube at those points beyond their limits.

From our improvements therefore it is obvious that in the event of a puncture in the sectional air-tube A it would simply mean that only one of the sections or compartments B would become deflated, which would not effect the efficiency of the machine so as to cause any material inconvenience to the rider or to the occupants of the carriage, motor-car, or other vehicle to which the tire is applied. Even if two contiguous sections were punctured there would be little effect.

Of course it is to be understood that primarily our invention is intended to be used as an inner air-chamber having an outer covering or series of coverings; but it may also be used as a single tire. In such case any suitable arrangement for fixing the same to the rim of the wheel would be provided.

Having now particularly described and ascertained the nature of our invention and in what manner the same is to be performed, we declare that what we claim is—

1. A pneumatic tire for vehicles comprising an expansible continuous air-tube formed with radial compartments and with necks providing air-passages connecting the said compartments, and an expansible continuous air-tube extending through the said necks whereby the passages connecting the compartments are closed; substantially as described.

2. A pneumatic tire for vehicles comprising an expansible continuous air-tube formed with radial compartments and with necks providing air-passages connecting the compartments, the strengthening-bands surrounding the said necks, and an expansible continuous air-tube extending through the said necks whereby the passages connecting the compartments are closed; substantially as described.

3. A pneumatic tire for vehicles comprising an expansible continuous air-tube formed with radial compartments and with necks providing air-passages connecting the said compartments, an expansible continuous air-tube extending through the said necks whereby the passages connecting the compartments are closed, and the inflating-valve connected with the said compartment-tube; substantially as described.

4. A pneumatic tire for vehicles comprising an expansible continuous air-tube formed with radial compartments and with necks providing air-passages connecting the said compartments, an expansible continuous air-tube extending through the said necks whereby the passages connecting the compartments are closed, and the inflating-valve connected with the said closing-tube; substantially as described.

In witness whereof we have hereunto set our hands in the presence of two subscribing witnesses.

RODERICK McLEOD, JUNIOR.
ALEXANDER MATHERS McLEOD.

Witnesses:
ANGUS MERKESON,
MARY McLEOD.